United States Patent [19]

Carpentier

[11] Patent Number: 4,498,492
[45] Date of Patent: Feb. 12, 1985

[54] DUST VALVE AND TRAP

[75] Inventor: Urgel R. Carpentier, Plattsburgh, N.Y.

[73] Assignee: Plattsburgh Foundry, Inc., Plattsburgh, N.Y.

[21] Appl. No.: 361,799

[22] Filed: Mar. 25, 1982

[51] Int. Cl.[3] .............................................. F16K 1/16
[52] U.S. Cl. ................................ 137/315; 251/118; 251/298; 137/613
[58] Field of Search ................ 251/298, 299, 118; 137/315, 613

[56] References Cited

U.S. PATENT DOCUMENTS

| | | | |
|---|---|---|---|
| 599,099 | 2/1898 | Hibbard | 251/298 |
| 3,283,772 | 11/1966 | Ensign | 251/118 |
| 3,410,422 | 11/1968 | Carpentier | 137/627.5 |
| 3,937,441 | 2/1976 | Baumann | 251/298 |
| 4,033,549 | 7/1977 | Stamer | 251/298 |
| 4,121,607 | 10/1978 | Bader | 251/298 |
| 4,190,074 | 2/1980 | Mailliet et al. | 251/298 |
| 4,253,485 | 3/1981 | Legille | 251/298 |

Primary Examiner—Martin P. Schwadron
Assistant Examiner—Stephen M. Hepperle
Attorney, Agent, or Firm—LeBlanc, Nolan, Shur & Nies

[57] ABSTRACT

A dust trap is disclosed including a pair of coaxially mounted dust valves. Each valve has a valve body with a flow path therethrough. A cylindrical seat is mounted in each body and a frustro conical flapper is provided having an angled surface which seats against a beveled internal surface of the seat. The flapper is mounted on an actuator shaft and rotates from a seated position to an open position substantially parallel to the flow path. A deflector is mounted in the seat and a wear plate is provided along an internal wall of the body opposite the actuator shaft so that dust passing through the valve does not impinge on the open flapper. An access door is also provided to inspect, clear or replace the flapper and seat.

5 Claims, 5 Drawing Figures

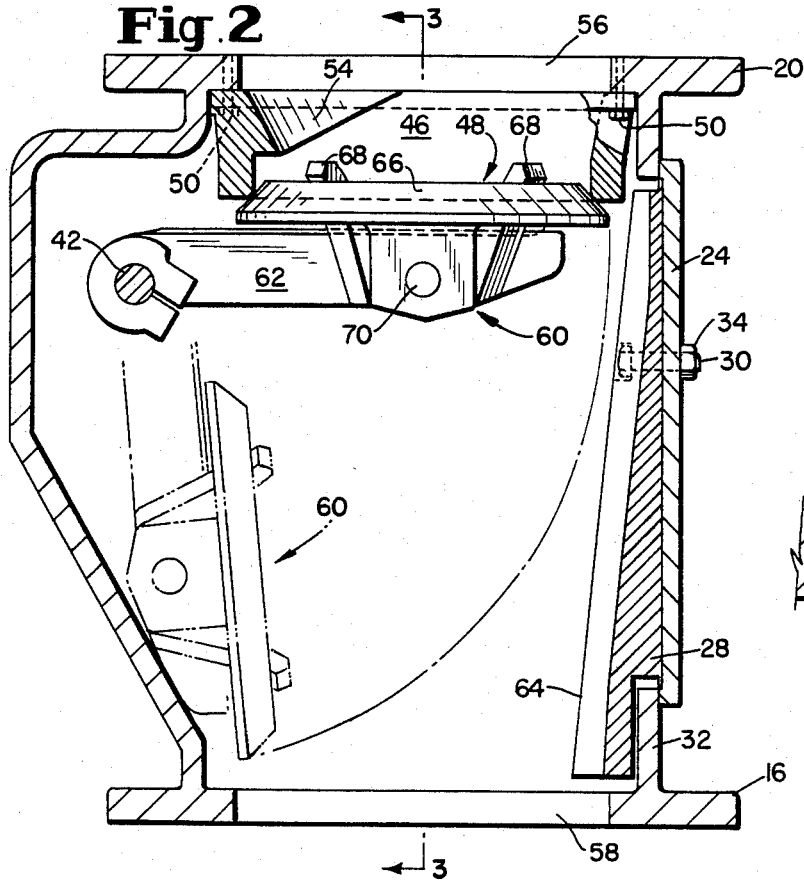
Fig. 2
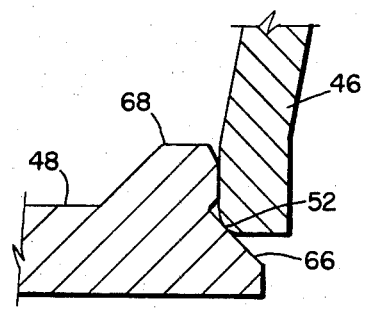
Fig. 5
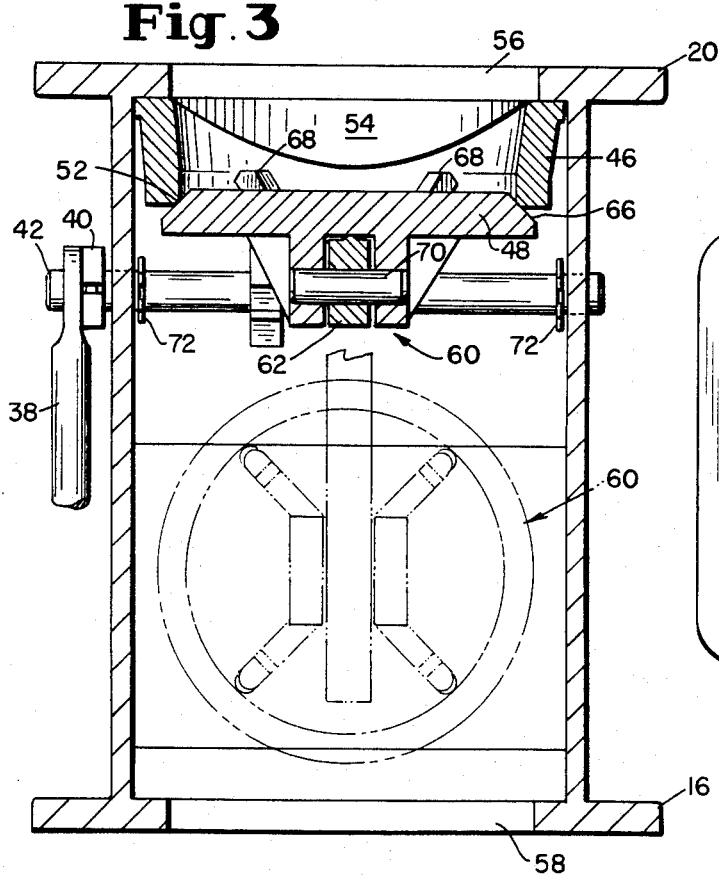
Fig. 3
Fig. 4

DUST VALVE AND TRAP

This invention relates to a dust trap and valve system therefor, and more specifically to an improved dust valve which will permit inspection, cleaning and/or replacement of wearing surfaces without disconnecting or removing the entire trap unit, and which will exhibit improved seating characteristics and wear resistance to abrasive materials.

In U.S. Pat. No. 3,257,045 and the improvement thereon No. 3,410,422, assigned to the assignee of this invention, there was described a dust trap and valve assembly which would permit inspection, cleaning, and replacement of worn parts without dismantling the entire assembly. Prior to that invention, dust traps and valves therefor were provided as an integral unit. When it was necessary to replace worn parts, it was necessary to either replace the entire trap unit or at least remove the trap unit from its vacuum line for disassembly. The improvement described in the above-identified patents utilized a valve seat and flapper disposed adjacent an access door. By removing the access door from the trap unit the flapper and seat could be visually inspected, cleaned, or removed and replaced. The device of the instant invention is yet another improvement utilizing a circular valve seat and frustro conical flapper for improved seating characteristics and a deflector means for reducing wear on the valve flapper as abrasive materials pass through the trap housing. Accordingly, the disclosures of the above-referenced U.S. patents are hereby incorporated by reference.

Basically, dust traps are well known and are used in dust collection systems wherein the dust particles are abrasive, highly abrasive, or in some instances non-abrasive. Dust collection systems are maintained under vacuum and the traps are utilized to permit the free dumping of dust collected in the systems without exposing the vacuum in the vacuum line to the atmosphere. A dust trap utilizes normally a pair of dust valves installed in a housing which are operated by cycling the opening and closing of the valves so that dust enters a first chamber from the vacuum line, communication between that chamber and the vacuum line is closed, and dust then enters a second chamber by gravity and exits the trap. Communication between the second and first chamber is then closed and communication between the first chamber and vacuum line is subsequently opened to repeat the process. Dust valves are important in iron or sintering plants, pelletizing plants and a wide variety of other operations well known in the art. Valves have also been utilized in the manufacture of non-abrasive materials such as talc. The instant invention, however, is primarily intended for use with abrasive materials as noted above.

In the above-identified patents, the flapper described is a rectangular plate which engages a seat at an acute angle to the vertical. The seat consists of a long side and a short side, and the valve includes a drive means for closing and opening the valve by moving the flapper into and out of engagement with the seat. The seat then describes a rectangle in cross-section having leading edges which engage the peripheral upper surface of the flapper to close the valve. The drive means is intended to provide a snap action to quickly close the valve. However, the metal-to-metal interface between the flapper and seat is subject to wear as abrasive particles pass through the valve. Obviously, as the interface surfaces wear, they will reach a point when the valve will no longer be capable of sealing the vacuum line from the atmosphere. At this point the worn surfaces must either be replaced or reground and therefore the dust trap and valves described in the above patents had the capability of rapid inspection, removal, and replacement of these surfaces through an access door, thereby minimizing down time for the unit.

It has been discovered, however, that an improved dust valve can be provided utilizing a frustro conical flapper which engages a corresponding valve seat at an angle substantially perpendicular to the vertical. The angled frustro conical surfaces then engage the interior surfaces of the seat to provide improved sealing capability against wear from abrasive dust particles. In addition, the device of this invention further reduces wear when dust passes through the valve by providing a deflection means whereby the dust particles will not normally impinge upon the upper surface of the open, frustro conical flapper. The flapper opens the valve by moving to a position substantially parallel to the vertical. A deflector and wear plate are also provided in the valve seat and adjacent the access door whereby the dust particles will be deflected away from the open flapper sealing surface when passing through the valve.

As is described in the above-referenced patents and as is well known in the prior art, a variety of different means can be provided for opening and closing the valve flappers. Pneumatic or hydraulic means with conventional controls can be utilized and are preferred. A motor means could also be utilized, and a mechanical spring or counter-balancing weight could also be utilized. The embodiment of this invention described hereinafter is not intended to be limited to the particular means utilized to open and close the valves in sequence.

Accordingly, it is an object of this invention to provide an improved dust trap and valves therefor which will be wear resistant to a greater degree with abrasive materials.

It is another object of this invention to provide a circular dust valve having a valve seat and a frustro conical flapper intended to seat therein, which flapper rotates out of engagement with the valve seat to permit the passage of dust therethrough.

It is still another object of this invention to provide a frustro conical dust valve flapper and a corresponding circular valve seat for receiving the flapper interfacing surfaces so that the flapper will be disposed substantially perpendicular to the vertical when the valve is closed and will rotate to a position substantially parallel to the vertical when the valve is open and which will further include a deflector means so that dust passing through the valve will not impinge upon the open flapper interfacing surface.

These and other objects will become readily apparent with reference to the drawings and following description wherein:

FIG. 2 is a vertical cross-section through one of the valve units of this invention showing the open flapper in phantom;

FIG. 3 is a cross-sectional view taken along line 3—3 of FIG. 2;

FIG. 4 is a top plan view of the valve seat of the valve of this invention exposing the deflector surface; and FIG. 5 is a fragmentary cross-sectional view illustrating the flapper engaging the seat with one of the four alignment lugs shown.

Figure 1:
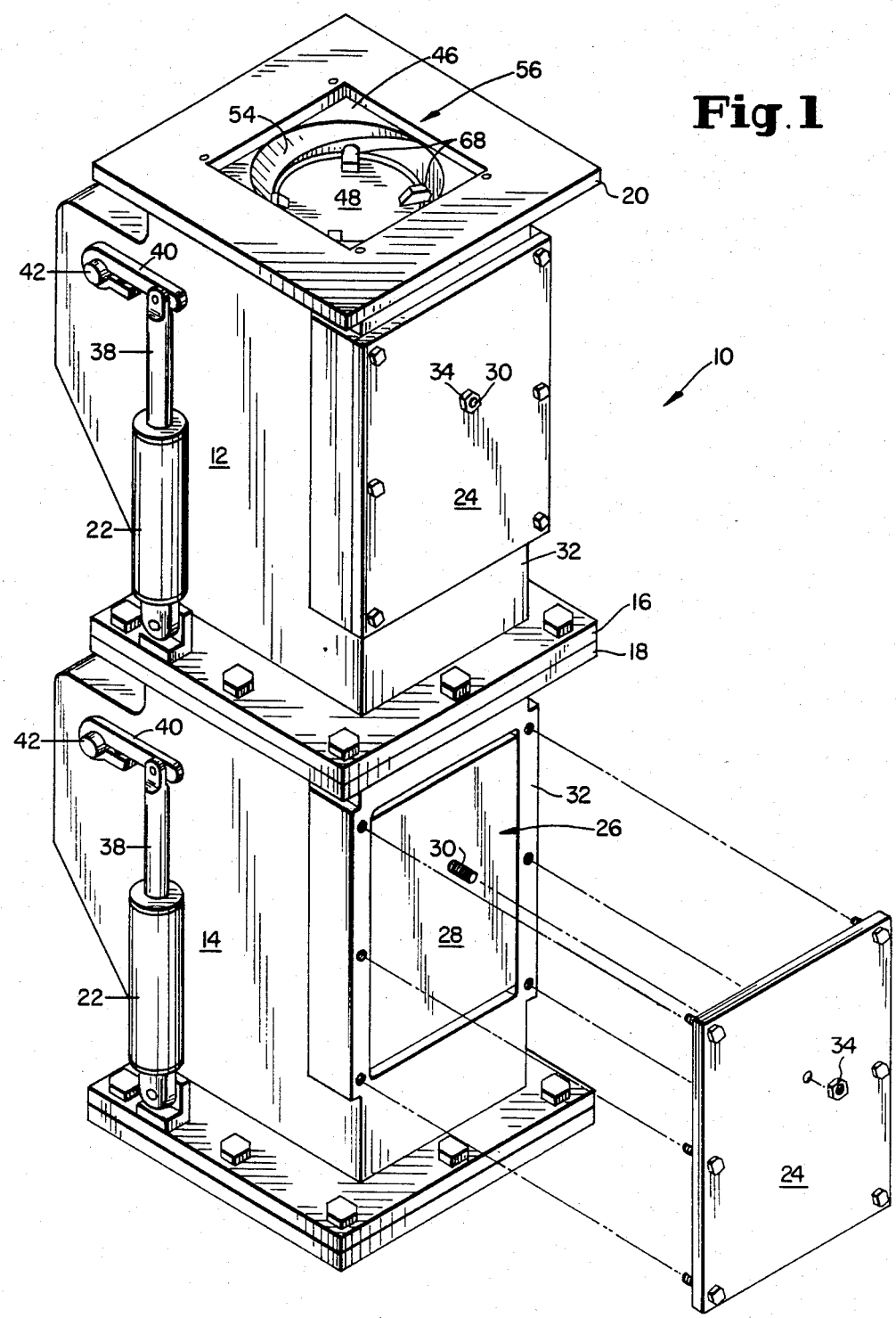
FIG. 1 is a perspective view of the dust valve unit of this invention having an access door removed exposing the back of a wear plate therein.

With attention to the drawings and to FIG. 1 in particular, the dust trap 10 of this invention consists of identical dust valves 12 and 14 which are bolted together at lower and upper mounting flanges 16 and 18. The upper mounting flange 20 of upper valve 12 is mounted on a vacuum line (not shown) in the conventional fashion. An external drive means 22 is provided to open and close the valve, as will be subsequently described. Drive means 22 is shown as a piston and cylinder with an external controller (not shown). However, as noted above, any conventional drive means can be utilized, and this invention is not intended to be limited to pneumatic, hydraulic, or other conventional types of drive means.

An access plate 24 normally covers an access opening 26. A wear plate 28 is provided within the valve at the access opening, and is preferably mounted by a bolt 30 to the plate 24. Accordingly, in order to inspect the interior of the valve, the access plate 24 is unbolted from the housing 32 of either valve 12 or 14 as shown in FIG. 1, and the nut 34 removed from bolt 30. The access door 24 may then be removed from the valve, exposing wear plate 28, which may also be removed to provide access to the interior of the valve. This type of access opening as in the above-referenced prior patents, permits inspection, cleaning, and replacement of parts within the valve, without actually removing flange 20 from the vacuum line (not shown).

The drive means 22 as shown includes a connecting rod 38 which in turn is attached to a lever arm 40. Lever arm 40 is affixed to an end of shaft 42 which in turn mounts the valve flapper as will be subsequently described. Accordingly, vertical movement of connecting rod 38 will be translated through lever arm 40 to rotational movement of shaft 42. Sequential opening and closing of the valves in trap 10 is achieved by drive means 22, causing the shafts 42 to rotate in the desired direction. Any conventional controller (not shown) may be utilized for operation of the trap as will be subsequently explained.

With attention to FIGS. 2–5, there is shown, for the purposes of illustration, a single valve member either valve 12 or 14. The valve includes a housing 32 and in the case of valve 12, lower mounting flange 16 and an upper mounting flange 20 for attachment to a vacuum line (not shown).

The valve itself consists of a valve seat 46 and a flapper 48. Seat 46 is bolted to flange 20 as shown in FIG. 2 and is removable by removing the bolts from within the housing 32. Access to the bolts 50 then is through the access opening 26. Valve seat 46 includes an interior radius 52 which is intended to receive and mate with the flapper 48 to provide a seal. The bottom inside edge of the seat is ground radially so that the flapper comes up against a radius on the inside of the seat. Seat 46 further includes a semicircular deflector 54 which in conjunction with wear plate 28 facilitates passage of the dust particles vertically through the interior of housing 32 from the inlet port 56 through an outlet port 58 when flapper 48 is disposed in the position shown in phantom in FIGS. 2 and 3.

Flapper 48 is preferably mounted by a clevis and pin assembly 60 to a lever arm 62 which in turn is affixed rigidly to shaft 42. Accordingly, downward movement of connecting rod 42 and lever arm 40 will cause the flapper to rotate from the closed position shown in FIGS. 2 and 3 to the open position shown in phantom in FIGS. 2 and 3. The flapper of this invention then rotates approximately 90° from a closed position disposed perpendicular to the vertical access of the device to an open position disposed substantially parallel to the vertical access of the device. Dust particles entering inlet 56 then are deflected by deflector 54 onto wear plate 28 which has a wear surface 64 which is semicircular in configuration and ultimately through outlet port 58. In this way, the particles do not impinge upon flapper 48 as they pass through the device. The flapper 48 then will not be subject to the extreme wear which could occur if abrasive dust particles passing through the valve impinged on its surface. Flapper 48 for sealing purposes is frustro conical in configuration providing an inclined surface 66 which mates with radius 52 of valve seat 46. In addition, four centering lugs 68 are provided which also guide the flapper into the seat when connecting rod 38 moves upwardly. As noted in our prior patents, it is desirable to close the valve with a "snapping" action for sealing purposes.

In order to remove the flapper for grinding or replacement, the pin 70 in clevis 60 may be removable, or in the alternative, if desired, lever arm 66 may be removable from shaft 42 by any conventional fastening means (not shown). As will be obvious to those skilled in the art, the interior of housing 32 is intended to be sealed. Therefore, shaft 42 will extend through housing 32 and appropriate bearings for sealing purposes will be provided as shown in general at 72 in FIG. 3. In addition, appropriate gaskets may be required at the flanges 16, 18, or 20, and at the access door 24.

OPERATION

The trap 10 of this invention functions similarly to that described in our above-identified patents. For example, the flapper in upper valve 12 may be opened and the flapper in lower valve 14 closed to seal the vacuum line (not shown) from the atmosphere. Dust particles from within the line accumulate within the upper valve 12 against the closed flapper 48 of lower valve 14 for a predetermined period of time. Then the upper drive means 22 will close the upper valve 12 by rotating the flapper 48 against seat 46. Lower valve 14 is then opened by rotating the flapper 48 from the position shown in FIGS. 2 and 3 to the position shown in phantom in FIGS. 2 and 3. The dust particles collected then fall through the device. After the lower valve is empty lower valve 14 is empty, the valve is closed by roating flapper 48 against seat 46 and the upper valve is opened by rotating flapper 48 away from seat 46 to repeat the process. The operation may be manual, or preferably controlled, as desired.

In summary then, by providing a frustro conical valve flapper in combination with the deflector and wear plate, a circular valve is provided which will exhibit greatly improved wear characteristics. In addition, the frustro conical flapper is received within the seat and automatically aligned therewith to provide better sealing capability. The device of this invention, then, has been found to be preferable to prior devices relative to abrasive particles and requires greatly reduced downtime for maintenance or replacement of the parts therein. When it is necessary, however, to replace or grind a wear surface, all of such surfaces may be removed from within the valve at the access opening without disassembling the entire trap and parts can be similarly replaced through the opening. Therefore, even when it is necessary to replace parts, the replacement may be rapidly and efficiently achieved.

The invention may be embodied in other specific forms without departing from the spirit or essential characteristics thereof. The present embodiment is, therefore, to be considered in all respects as illustrative and not restrictive, the scope of the invention being indicated by the appended claims and all changes which come within the meaning and range of equivalency of the claims are, therefore, intended to be embraced therein.

What is claimed is:

1. A dust valve body having a flow path therethrough from one end to the other;
   a conduit member removably mounted in said valve body and forming a valve seat, the flow path through said conduit member being substantially coaxial with the flow path through said valve body, said conduit member being substantially cylindrical and forming said valve seat on a radial internal edge thereof;
   a valve actuator shaft passing through said valve body adjacent a side of said valve body and means for rotating said shaft;
   a frustro conical valve flap and self aligning means carried thereby for engaging said flap at its frustro conical surface with the radial edge of said seat, said flap removably coupled to said valve actuator shaft for moving into and out of engagement with said valve seat whereby a seal will be maintained between the frustro conical surface of said flap and the radial edge of said seat; means for deflecting the flow through said conduit and said valve body so that when said flap is fully rotated out of engagement with said valve seat said flow will not impinge upon the surface thereof; and access means carried by said valve body for providing access to the interior of said body for removal of said conduit member and said valve flap from inside said valve body;
   said conduit member being disposed adjacent the upper portion of said valve body and said valve seat is disposed substantially perpendicular to the vertical longitudinal axis of said valve body;
   said means for deflecting the flow includes a semicircular flange disposed within said conduit member opposite said valve seat to deflect the flow towards a further deflecting means comprising a wear plate;
   said wear plate disposed adjacent the side of said valve body opposite the valve actuator shaft.

2. The valve of claim 1 wherein said frustro conical flap member further comprises alignment means disposed on the upper surface thereof for aligning said flap with said valve seat.

3. A dust trap comprising a pair of dust valves coaxially mounted to each other; each of said valves comprising
   a valve body having a longitudinal flow path therethrough;
   a conduit member removably mounted in said valve body coaxially with the flow path and forming a valve seat, said valve seat being disposed perpendicular to the longitudinal axis of said body and having a radial internal edge and being circular in cross-section; a valve actuator shaft passing through said valve body adjacent a side of said body, said shaft rotatable approximately 90 degrees, and means for rotating said shaft;
   a frustro conical valve flap and self aligning means carried thereby for engaging said flap at its frustro conical surface with the radial edge of said seat, said flap removably afixed to said shaft and movable into and out of engagement with the radial edge of the valve seat from a position wherein the flap is disposed in a sealing relationship abutting said seat in a plane substantially perpendicular to the longitudinal axis of said body to a position substantially parallel to the longitudinal axis of said body; means disposed within said body for deflecting a flow of particles therethrough so that when said flap is disposed parallel to the longitudinal axis and flow path, said particles will not impinge upon the surface thereof; and access means for providing access to the interior of said valve body for removal of said conduit member and valve flap from inside said valve body, said access means including a removable cover plate and an access opening disposed through a side of said body opposite the valve actuator shaft;
   said deflector means further comprising a semicircular angle wall carried by said conduit for directing a flow through said conduit away from said flap and towards a further deflecting means when said flap is disposed parallel to the longitudinal axis of said valve body;
   said further deflecting means comprising a wear plate covering at least a portion of the interior wall of said body opposite said actuator shaft for deflecting the flow through said valve body.

4. The dust trap of claim 3 wherein said valve body further comprises alignment means for aligning said frustro conical flap with the valve seat whereby when said flap seats on said valve seat it is received within a portion of said conduit member.

5. The dust trap of claim 4 wherein said alignment means further comprises a plurality of alignment lugs carried by the upper surface of said flapper for abutting the inner surface of said conduit member when said flapper moves into engagement with said valve seat.

* * * * *